(12) United States Patent
Sasaki

(10) Patent No.: US 6,597,524 B2
(45) Date of Patent: Jul. 22, 2003

(54) LENS DEVICE

(75) Inventor: Ryuta Sasaki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/092,556

(22) Filed: Mar. 8, 2002

(65) Prior Publication Data

US 2002/0126401 A1 Sep. 12, 2002

(30) Foreign Application Priority Data

Mar. 8, 2001 (JP) .................................. 2001-064279

(51) Int. Cl.[7] .................................................. G02B 7/02
(52) U.S. Cl. ........................ 359/811; 359/823; 359/822
(58) Field of Search ................................. 359/811, 823, 359/822, 829, 819, 813, 814, 818

(56) References Cited

U.S. PATENT DOCUMENTS 5,748,394 A * 5/1998 Shimazaki et al. ......... 359/823
5,758,943 A * 6/1998 Shirai et al. .................. 362/66

* cited by examiner

Primary Examiner—Jordan M. Schwartz
Assistant Examiner—Timothy J Thompson
(74) Attorney, Agent, or Firm—Birch, Stewart, Kolasch & Birch, LLP

(57) ABSTRACT

The lens device performs focusing adjustment by moving a lens holding frame for a focusing lens in the direction along an optical axis by a lead screw device, in which a nut member is engaged with an engaging portion formed on a nut mounting portion of the lens holding frame and the nut member is positioned against the nut mounting portion, thus improving forwarding precision of the lead screw device to perform focusing operation with high precision. The nut member is engaged with a protruding portion formed on the nut mounting portion of a third lens frame in a third lens frame for a third lens, which is a focusing lens, and the nut member is positioned against the nut mounting portion, thus preventing inclination, misalignment or deformation of the nut member against the nut mounting portion. Thereby the forwarding precision of the lead screw device is improved; accordingly, the focusing operation can be performed with high precision.

1 Claim, 4 Drawing Sheets

PRIOR ART

LENS DEVICE

BACKGROUND OF THE INVENTION

1. Field of the Invention

The present invention relates to an autofocus lens device applied to an electronic still camera having a solid-state image pickup element having a large number of pixels.

2. Description of the Related Art

A focusing lens of an autofocus type is driven by a motor in accordance with an AF signal from a camera and moved forward or backward in a direction along a photographing optical axis to perform a focusing operation.

In such a driving mechanism for the autofocusing by using a lead screw device, for example, a screw axis is connected to an output axis of the motor, the screw axis is screwed in a nut member mounted on a focusing lens holding frame while the focusing lens holding frame is movably joined to a guide bar provided in parallel with the photographing optical axis for stopping the rotation of the focusing lens holding frame. Accordingly, when the motor drives, the focusing lens holding frame moves forward or backward in the direction along the photographing optical axis by forwarding action of the screw axis and straight guiding action of the guide bar, thus performing the focusing operation.

FIG. 5 is an enlarged view of a main part, which shows a mounting structure for a nut member 2 or a focusing lens holding frame 1. In FIG. 5, the nut member 2 is formed into an inverted U-shape, and on inner surfaces thereof facing each other, screwing portions 4, 4 in which a screw axis 3 is screwed are threaded. The nut member 2 thus formed is inserted in the nut mounting portion 5 formed on the focusing lens holding frame 1 with an opening portion downward. Thereby the nut member 2 is mounted on the focusing lens holding frame 1.

However, since the above-described conventional lens device is configured so that, as shown in FIG. 5, gaps 6, 6 are formed between the nut mounting portion 5 of the focusing lens holding frame 1 and the nut member 2 in view of production errors of both. Accordingly, there is a problem that the nut member 2 is inclined or misaligned against the nut mounting portion 5.

In recent electronic still cameras, higher precision in the focusing operation is required as the number of pixels of a CCD, which is a solid-state image pickup element, increases. However, if the nut member 2 is inclined or misaligned as described above, forwarding precision is declined; consequently, there is a drawback that it is not possible to perform focusing operation with high precision.

SUMMARY OF THE INVENTION

The present invention has been developed in view of the above-described circumstances, and an object of the present invention is to provide a lens device capable of performing focusing operation with high precision.

In order to achieve the above-described object, the present invention is directed to a lens device, comprising: a lens holding frame; a screw axis provided in parallel with an optical axis, the screw axis moving the lens holding frame forward and backward along the optical axis; a nut member formed into an inverted U-shape, in which the screw axis is screwed; and a nut mounting portion formed on the lens holding frame, on which the nut member is mounted, the nut mounting portion transferring a moving force of the nut member in the direction along the optical axis to the lens holding frame, the moving force being generated by rotation of the screw axis, wherein an engaging portion for positioning the nut member against the nut mounting portion is formed on the nut mounting portion formed on the lens holding frame.

According to the present invention, the nut member is engaged with the engaging portion formed on the nut mounting portion of the lens holding frame to position the nut member against the nut mounting portion, thus preventing inclination, misalignment or deformation of the nut member against the nut mounting portion. Consequently, the forwarding precision of the lead screw device is improved; therefore, the focusing operation can be performed with high precision.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereinunder preferred embodiments will be described in detail for a structure of a lens device according to preferred embodiments of the present invention in accordance with the accompanied drawings.

Figure 1:
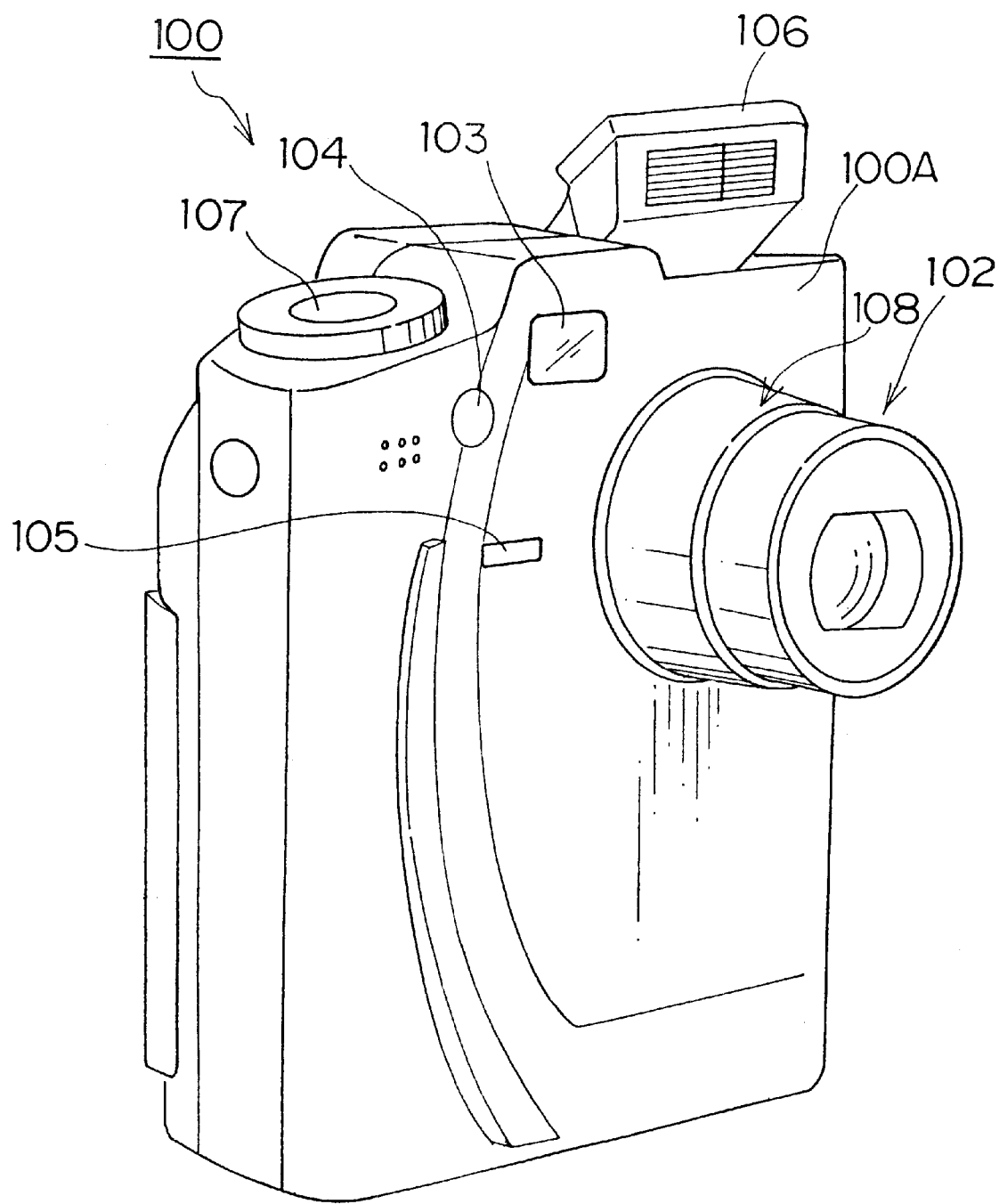
FIG. 1 is a perspective view showing an electronic still camera to which a lens device according to the present invention is applied.

FIG. 1 is an external view of an electronic still camera 100 to which a lens device according to the present invention is applied. A lens device 102, a finder window 103, a flash adjustment sensor 104 and a self-timer lamp 105 are provided in predetermined positions on the front face of the main body 100A of the electronic still camera 100. A pop-up flash 106 and a release switch 107 are provided on the top face of the main body 100A, and an eyepiece of the finder, a liquid crystal display panel, an operation key and the like which are not shown in the figure are provided in respective predetermined positions on the back face of the main body 100A. The lens device 102 is of a collapsible/extensible type, and a lens mirror barrel 108 is extended forward (in the direction of a subject) from the front face of the main body 100A only when it is in use.

Figure 2:
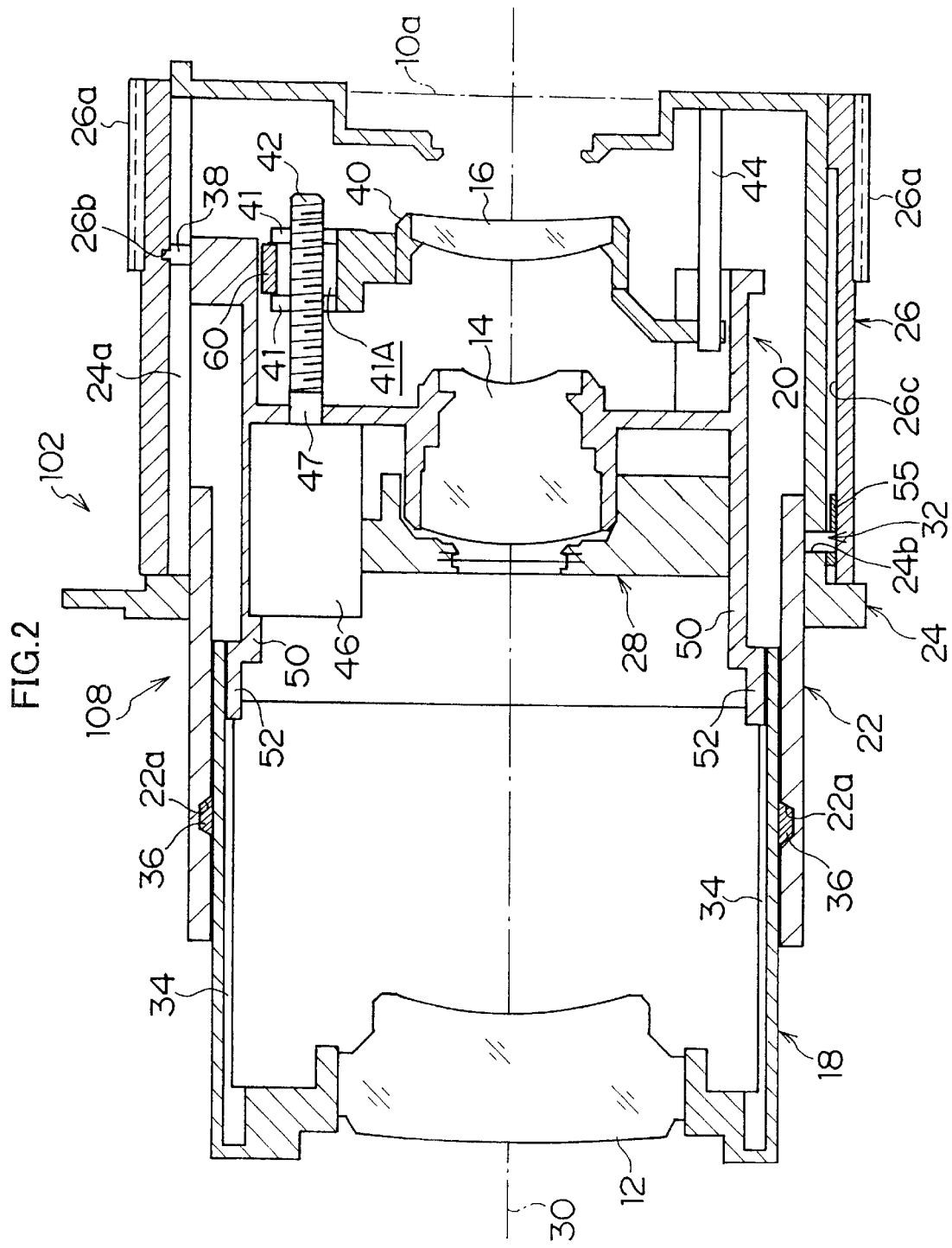
FIG. 2 is a cross-sectional view of the lens device shown in FIG. 1.

As shown in FIG. 2, the lens device 102 comprises a first lens 12, a second lens 14, a third lens (focusing lens) 16, a first lens barrel 18, a second lens barrel 20, a shift barrel 22, a fixed barrel 24, a cam barrel 26 and an aperture-setting shutter unit 28.

On the outer periphery of the cam barrel 26, a gear portion 26a is formed, to which the drive of a zoom motor (not shown) is transferred. Around an optical axis 30, the cam barrel 26 is rotated in contact with the outer periphery of the fixed barrel 24 by the transferred drive of the zoom motor.

The state of the lens device 102 is changed from a collapsed position to a telescopic position by rotation of the cam barrel 26 in "storage rotation area" from "initial position" to "middle position". It is further changed from the telescopic position to a wide position by rotation of the cam barrel 26 in "scaling rotation area" from "middle position" to "termination position".

On the inner peripheral surface of the cam barrel 26, a cam groove 26b for moving the second lens barrel 20 along the optical axis 30 and a straight guiding groove 26c for moving the shift barrel 22 along the optical axis 30 are formed. The straight guiding groove 26c can provide a rotation force of the cam barrel 26 to the shift barrel 22 through a cam follower 32.

On the fixed barrel 24, a straight guiding groove 24a for moving the second lens barrel 20 along the optical axis 30 and a cam groove 24b for moving the shift barrel 22 along the optical axis 30 are formed.

On the outer peripheral surface of the shift barrel 22, the cam follower 32 is provided. The cam follower 32 engages with the cam groove 24b and the straight guiding groove 26c through the cam groove 24b. Accordingly, the shift barrel 22 moves in the direction along the optical axis 30 with respect to the fixed barrel 24 while rotating in conjunction with the rotation of the cam barrel 26. On the inner peripheral surface of the shift barrel 22, cam grooves 22a are formed. The cam groove 24b, the straight guiding groove 26c and the cam follower 32 are provided to each of three-way split positions around the optical axis 30.

The first lens 12 is held inside the first lens barrel 18. Straight guiding grooves 34 are formed on the inner peripheral surface of the first lens barrel 18 and cam followers 36 that engage with the cam grooves 22a are provided on the outer peripheral surface of the first lens barrel 18. Therefore, straight guiding action of the second lens barrel 20 (described below) and forwarding action of the cam grooves 22a on the shift barrel 22 in the rotation of the shift barrel 22, causes the first lens barrel 18 to move in the direction along the optical axis 30 with respect to the shift barrel 22. The cam followers 36 and the cam grooves 22a are provided to each of three-way split positions around the optical axis 30.

The second lens 14 is held inside the second lens barrel 20. On the outer peripheral surface of the second lens barrel 20, a cam follower 38 is provided. The cam follower 38 engages with the straight guiding groove 24a and the cam groove 26b. Accordingly, the second lens barrel 20 moves along the optical axis 30 with respect to the fixed barrel 24 by rotation of the cam barrel 26. The cam follower 38, the cam groove 26b and the straight guiding groove 24a are provided to each of three-way split positions around the optical axis 30.

At the front end of the second lens barrel 20, arm portions 50, 50 are provided. On the outer peripheral surface side of the tip of each arm portion 50, a straight guiding protrusion 52 is provided. By engaging the straight guiding protrusions 52 with the straight guiding grooves 34 of the first lens barrel 18, above-described straight guiding action is generated. The reference character 10a indicates an imaging surface of the lens device 102.

The third lens 16 is held by a third lens frame 40 (the lens holding frame of the preset invention). The third lens frame 40 is supported by the second lens barrel 20 through the screw axis 42 of the lead screw device and a couple of guide bars 44 shown in FIG. 3 so as to move along the optical axis 30.

Figure 3:
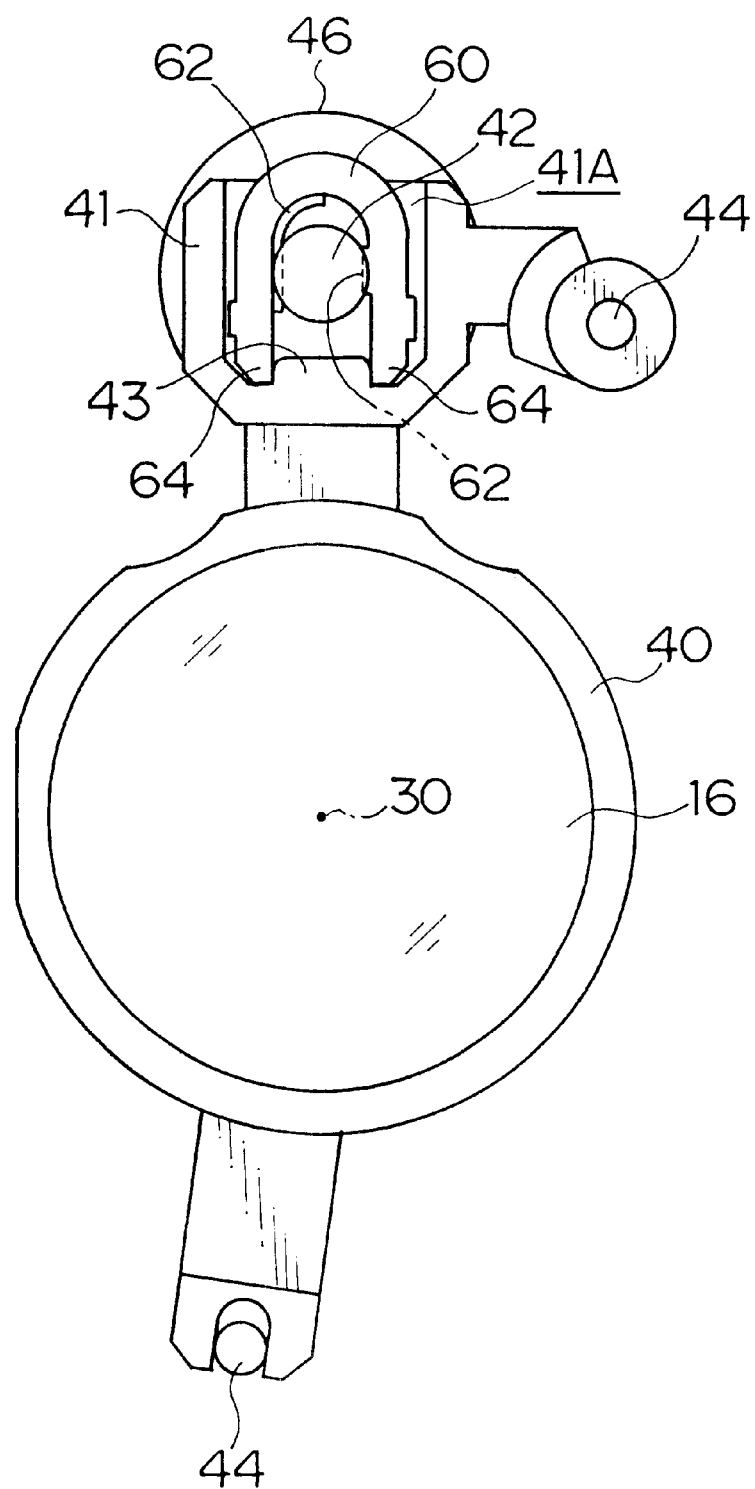
FIG. 3 is a structural view showing a driving mechanism of a third lens shown in FIG. 1.
Figure 4:
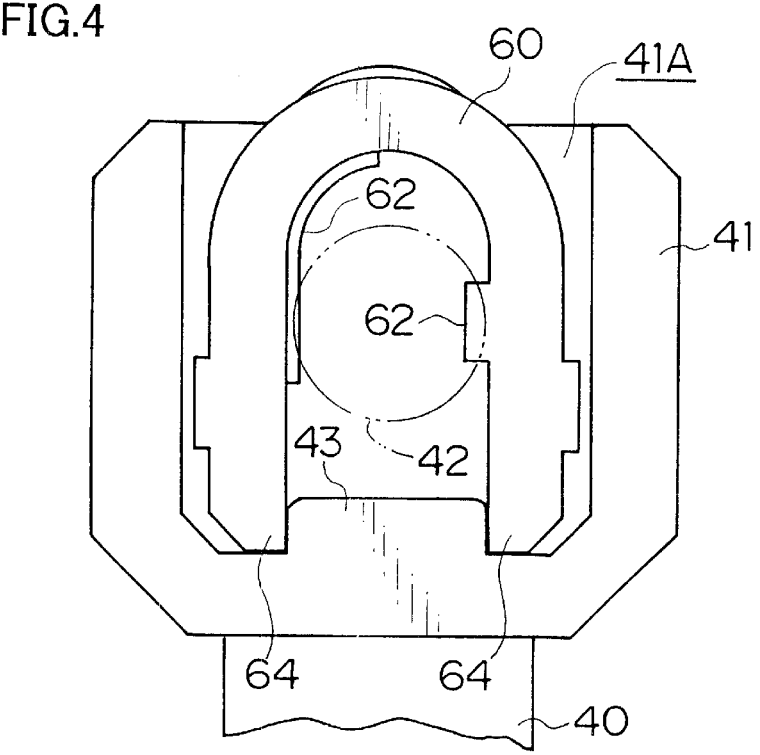
FIG. 4 is an enlarged view of a main part, which shows a mounting structure for a nut member on a third lens holding frame shown in FIG. 2.
Figure 5:
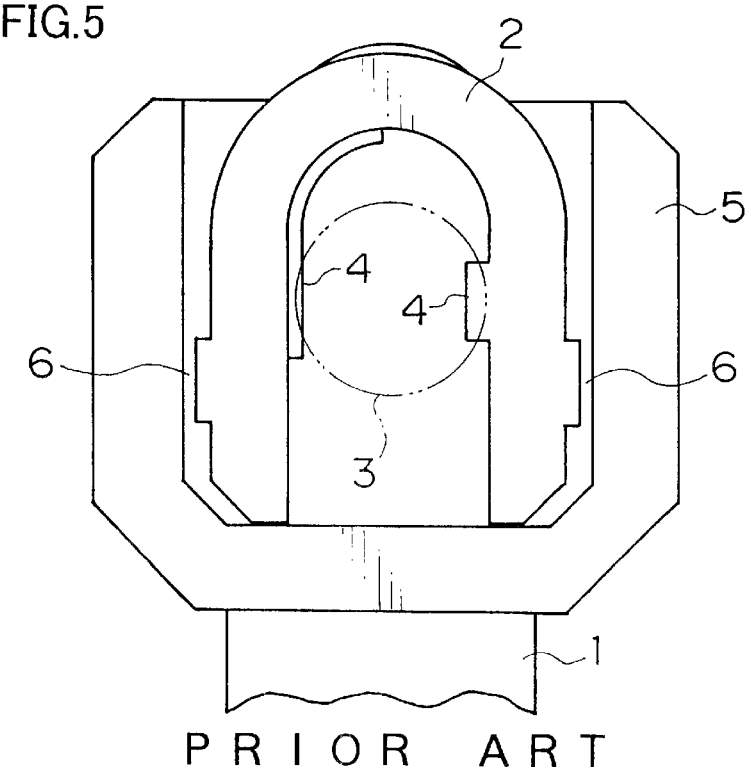
FIG. 5 is an enlarged view of a main part, which shows a conventional mounting structure for a nut member on a lens holding frame.

The screw axis 42 is arranged in parallel with the optical axis 30, connected to an output axis 47 of a focusing motor 46 incorporated in the mirror barrel 108 of FIG. 2, and screwed in the nut member 60 of an inverted U-shape shown in FIG. 4 that is mounted on the third lens frame 40. The nut member 60 is mounted in a gap 41A between the inner surfaces of a nut mounting portion 41, 41 formed on the upper end portion of the third lens frame 40 as shown in FIG. 3. On the inner surfaces of the nut member 60 facing each other, female screw threads 62, 62 in which the screw axis 42 is screwed are cut. Accordingly, when the motor 46 is driven, the third lens frame 40 moves forward or backward in the direction along the photographing optical axis by the forwarding action of the screw axis 42 and straight guiding action of the guide bars 44, 44, thereby the focusing operation by the third lens 16 is performed.

In the lens device 102 according to this embodiment, for preventing inclination, misalignment or deformation of the nut member 60 against the gap 41A between the inner surfaces of the nut mounting portion 41, 41, a projecting portion (engaging portion) 43 is integrally formed at the bottom portion of the nut mounting portion 41, 41, with which projection a couple of end portions 64, 64 of the nut member 60 are engaged as shown in FIG. 4. Consequently, the nut member 60 is securely positioned against the nut mounting portion 41, thus preventing inclination, misalignment or deformation of the nut member 60 against the nut mounting portion 41 as described above. This improves the forwarding precision of the lead screw device; therefore, in the electronic still camera 100 having a CCD with a large number of pixels, the focusing operation can be performed with high precision.

In this embodiment, an example in which the projecting portion 43 is formed as the engaging portion on the nut mounting portion 41 has been described. However, the invention is not limited thereto, and it may be possible to form a recessing portion on the nut mounting portion 41, with which the end portions 64, 64 of the nut member 60 are engaged.

As described so far, in the lens device according to the present invention, the engaging portion is formed on the nut mounting portion of the lens holding frame and the nut member is engaged with the engaging portion for being positioned against the nut mounting portion; therefore, the focusing operation can be performed with high precision.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens device, comprising:
   a lens holding frame;
   a screw axis provided in parallel with an optical axis, the screw axis moving the lens holding frame forward and backward along the optical axis;
   a nut member formed into an inverted U-shape, in which the screw axis is screwed; and
   a nut mounting portion formed on the lens holding frame, on which the nut member is mounted, the nut mounting portion transferring a moving force of the nut member in the direction along the optical axis to the lens holding frame, the moving force being generated by rotation of the screw axis,
   wherein an engaging portion for positioning the nut member against the nut mounting portion is formed on the nut mounting portion formed on the lens holding frame.

\* \* \* \* \*